US005699998A

United States Patent [19]

Zysman

[11] Patent Number: 5,699,998

[45] Date of Patent: Dec. 23, 1997

[54] MANUFACTURE OF POCKET SPRING ASSEMBLIES

[76] Inventor: Milton Zysman, Suite 801, 50 Prince Arthur Avenue, Toronto, Ontario, Canada, M5R 1B5

[21] Appl. No.: 500,904

[22] PCT Filed: Feb. 1, 1994

[86] PCT No.: PCT/CA94/00055

§ 371 Date: Sep. 18, 1995

§ 102(e) Date: Sep. 18, 1995

[87] PCT Pub. No.: WO94/18116

PCT Pub. Date: Aug. 18, 1994

[30] Foreign Application Priority Data

Feb. 1, 1993 [GB] United Kingdom .................... 9301927

[51] Int. Cl.[6] ........................................................ F16F 3/00

[52] U.S. Cl. ............................................ 267/189; 5/655.8

[58] Field of Search .................................. 267/89, 91, 93, 267/94; 53/114, 115, 527; 5/655.7, 655.8

[56] References Cited

U.S. PATENT DOCUMENTS

| | | | |
|---|---|---|---|
| 685,160 | 10/1901 | Marshall . | |
| 698,529 | 4/1902 | Marshall . | |
| 1,247,971 | 11/1917 | Krakauer . | |
| 1,253,272 | 1/1918 | Nachman . | |
| 1,270,840 | 7/1918 | Kelly . | |
| 1,284,384 | 11/1918 | Lewis . | |
| 1,287,663 | 12/1918 | Foster . | |
| 1,313,234 | 8/1919 | Jones . | |
| 1,370,533 | 3/1921 | Genge . | |
| 1,406,051 | 2/1922 | Marcus et al. . | |
| 1,445,416 | 2/1923 | Shields . | |
| 1,455,847 | 5/1923 | Meutsch . | |
| 1,465,766 | 8/1923 | Krakauer . | |
| 1,466,617 | 8/1923 | Foster . | |
| 1,560,588 | 11/1925 | Lewis . | |
| 1,685,851 | 10/1928 | MacInerney . | |
| 1,720,480 | 7/1929 | Karpen . | |
| 1,724,681 | 8/1929 | Roseman . | |
| 1,759,050 | 5/1930 | Gail . | |
| 1,813,993 | 7/1931 | Gail . | |
| 1,861,429 | 5/1932 | Schneider et al. . | |
| 1,867,872 | 7/1932 | Bronstien . | |
| 1,950,186 | 3/1934 | Lofman | 226/18 |
| 2,032,510 | 3/1936 | Spühl | 226/18 |
| 2,048,979 | 7/1936 | Trotta et al. | 5/353 |
| 2,320,153 | 5/1943 | Moske | 155/179 |
| 2,430,098 | 11/1947 | Binch | 5/353 |
| 2,615,180 | 10/1952 | Woller | 5/353 |
| 2,647,671 | 8/1953 | McInerney | 226/18 |
| 2,862,214 | 12/1958 | Thompson et al. | 5/353 |
| 2,934,219 | 4/1960 | Stumpf | 214/1 |
| 2,983,236 | 5/1961 | Thompson | 112/2 |
| 3,046,574 | 7/1962 | Erenberg et al. | 5/351 |
| 3,099,021 | 7/1963 | Wetzler | 5/353 |
| 3,168,792 | 2/1965 | Stumpf | 29/433 |
| 3,193,136 | 7/1965 | Stumpf | 221/40 |

(List continued on next page.)

*Primary Examiner*—Robert J. Oberleitner
*Assistant Examiner*—Pamela J. Lipka
*Attorney, Agent, or Firm*—Ridout & Maybee

[57] ABSTRACT

In the production of a pocket spring assembly, two layers of fabric are secured together along multiple parallel seam zones so as to form a quilt defining a plurality of parallel fabric tubes, the tubes so formed are supported on guides extending longitudinally through the tubes, portions of the quilt are repeatedly drawn from the guides at their one ends and folds formed in each layer of fabric in the drawn off portion are secured to form pockets from the drawn off portions of the quilt, and precompressed coil springs are passed through the guides and released into the pockets between each drawing of the quilt, with their axes perpendicular to both the axes of the fabric tubes and the direction of advancement of the quilt, so that secured folds in the fabric of the tubes in front of and behind the released springs retain them in the pockets. Spaced longitudinal slits are formed in the seam zones, the slits permitting the fabric to envelope the tubes.

27 Claims, 6 Drawing Sheets

U.S. PATENT DOCUMENTS

| | | | |
|---|---|---|---|
| 3,230,558 | 1/1966 | Duncan | 5/353 |
| 3,633,228 | 1/1972 | Zysman | 5/353 |
| 3,668,816 | 6/1972 | Thompson | 53/28 |
| 3,789,495 | 2/1974 | Stumpf | 29/429 |
| 3,869,739 | 3/1975 | Klein | 5/353 |
| 4,234,983 | 11/1980 | Stumpf | 5/477 |
| 4,234,984 | 11/1980 | Stumpf | 5/477 |
| 4,401,501 | 8/1983 | Stumpf | 156/367 |
| 4,439,977 | 4/1984 | Stumpf | 54/428 |
| 4,451,946 | 6/1984 | Stumpf | 5/477 |
| 4,485,506 | 12/1984 | Stumpf et al. | 5/477 |
| 4,491,491 | 1/1985 | Stumpf | 156/73.3 |
| 4,523,344 | 6/1985 | Stumpf et al. | 5/477 |
| 4,565,046 | 1/1986 | Stumpf | 53/114 |
| 4,566,926 | 1/1986 | Stumpf | 156/165 |
| 4,578,834 | 4/1986 | Stumpf | 5/477 |
| 4,679,266 | 7/1987 | Kraft | 5/464 |
| 4,854,023 | 8/1989 | Stumpf | 29/91 |
| 4,895,352 | 1/1990 | Stumpf | 267/80 |
| 4,986,518 | 1/1991 | Stumpf | 267/91 |
| 5,303,530 | 4/1994 | Rodgers | 53/114 |
| 5,319,815 | 6/1994 | Stumpf et al. | 5/477 |

MANUFACTURE OF POCKET SPRING ASSEMBLIES

This invention relates to pocket spring assemblies for cushions or mattresses, and to apparatus and methods for that manufacture.

Pocket spring assemblies consist of two dimensional arrays of coil springs contained in individual fabric pockets. Such a construction, often known as the Marshall construction after its inventor, has for almost a century been regarded as providing a highly desirable level of cushioning performance, but usage of it has been limited because of its high cost of manufacture, involving as it does the formation of the fabric pockets, the insertion of the compressed springs and the assembly and securing of the properly oriented pocketed springs into a two dimensional array. Various efforts have therefore been made to facilitate the manufacture of such arrays, as will be found described for example in U.S. Pat. No. 4,234,983 (Stumpf) which itself represents what is believed to be the most commercially successful attempt to date to automate the construction of pocket spring assemblies. This patent discloses the production of endless strips of pocketed springs which can then be assembled into the desired arrays. Even so, such pocket spring assemblies remain costly compared to other assemblies, which whilst of lower cushioning performance, can be assembled in a more highly automated manner.

It is an object of the present invention to provide an improved technique for the production of pocket spring assemblies which can directly produce pocketed springs in a two dimensional array.

According to the invention in its broadest aspect, two layers of fabric are secured together along multiple parallel seam zones so as to form a quilt defining a plurality of parallel fabric tubes, the tubes so formed are supported on guides extending longitudinally through the tubes, portions of the quilt are repeatedly drawn from the guides at their one ends and folds formed in the fabric of each drawn off portion are secured transverse to the axes of the tubes to form pockets in the drawn off portion, and precompressed coil springs are passed through the guides and released into the pockets between each drawing of the quilt, with their axes perpendicular to both the axes of the tubes and the direction of advancement of the quilt, so that fastened folds of the fabric in front of and behind the released springs retain them in the pockets. In a preferred arrangement, the parallel seam zones contain double seams, and longitudinal slots are formed in the fabric between the double seams at a pitch equal to the length of fabric which forms a pocket.

The above method permits a pocket spring assembly to be produced directly in an automated manner from fabric and coil springs. The securing together of the layers of fabric and the closure of the tubes may be performed by stitching, or welding, or any combination of those techniques, although the use of two part fasteners is preferred. For forming the assembly, the quilt is transferred to and gathered upon the guides which are supported by a movable table of a spring inserting machine. The table is moved so that a spring dispensing unit, which receives springs from a coil forming machine, is aligned with the one end of each guide in turn and successively inserts compressed springs into the end of each guide. This results in a row of compressed springs already in the guide being advanced along the guide, causing a spring to be released at the other end of the guide into a portion of the associated tube which has been drawn from the guide and closed by the fastening of folds of the fabric to form a pocket, for example by the application of two-part fasteners. After a complete pass of the table past the spring dispensing unit, the tubes are drawn further off the guides so as to permit further closures of folds of the fabric to provide pockets to receive the next row of springs to pass through the guides. The zones in the seams between the tubes permit better formation of pockets around the sleeves and provide a convenient means of indexing the tubes as they are drawn off between insertion of each row of springs.

The invention also extends to apparatus for carrying out the method.

Further details of the invention will be apparent from the following description of a presently preferred embodiment with reference to the accompanying drawings, in which.

Figure 1:
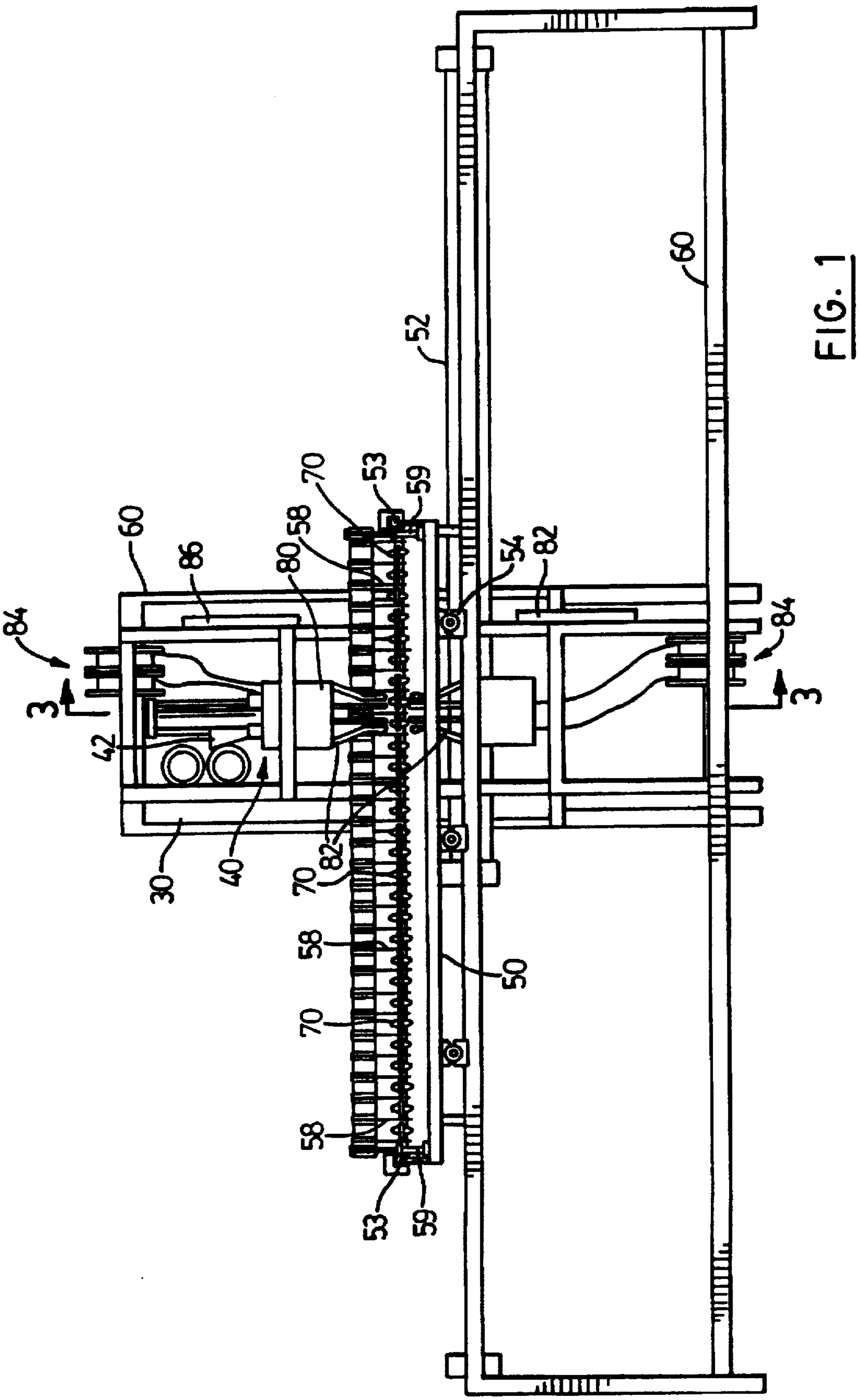
FIG. 1 is a front elevation of an apparatus for manufacturing pocket spring assemblies.
Figure 2:
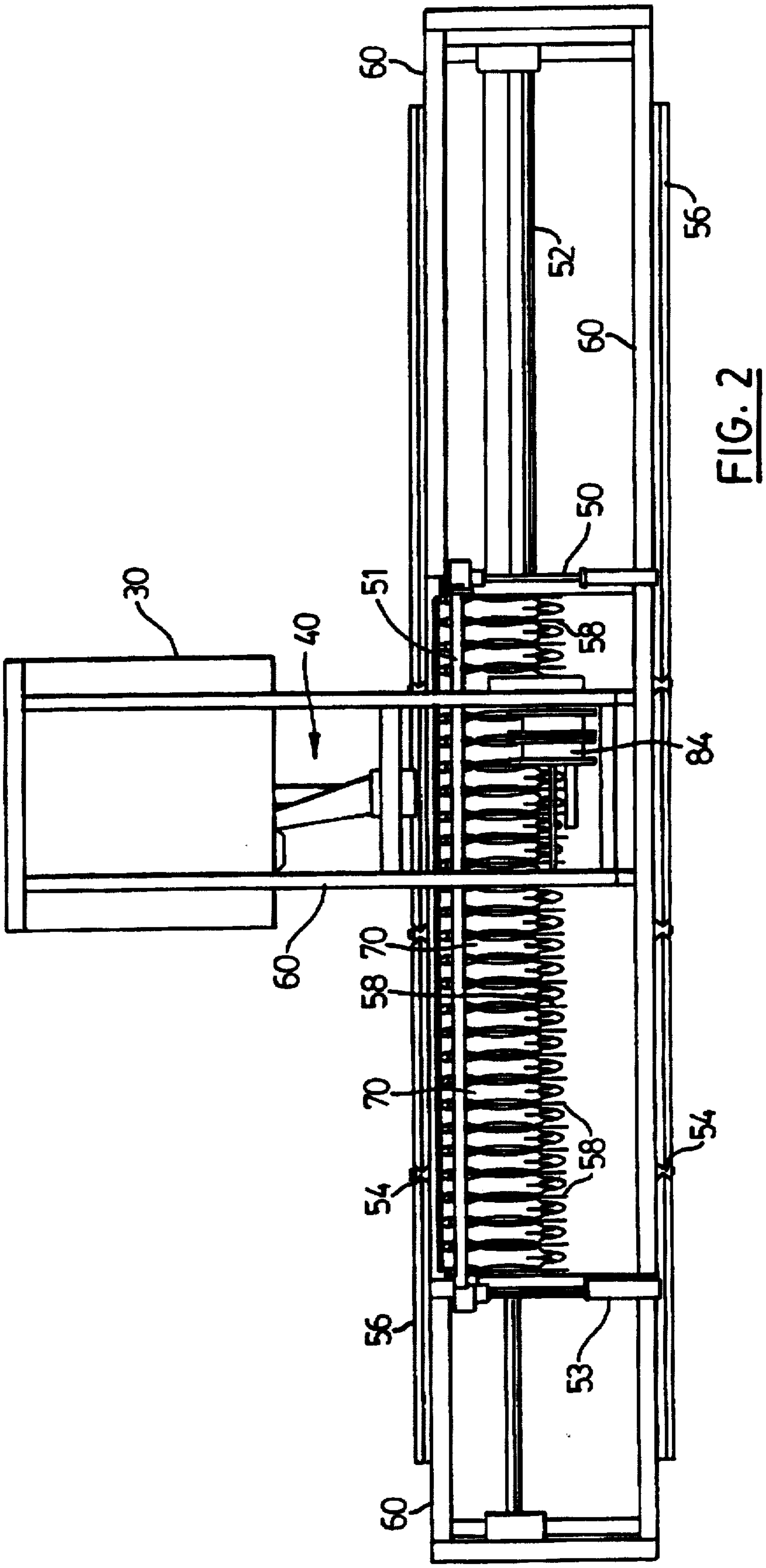
FIG. 2 is a plan view of the apparatus of FIG. 1.
Figure 3:
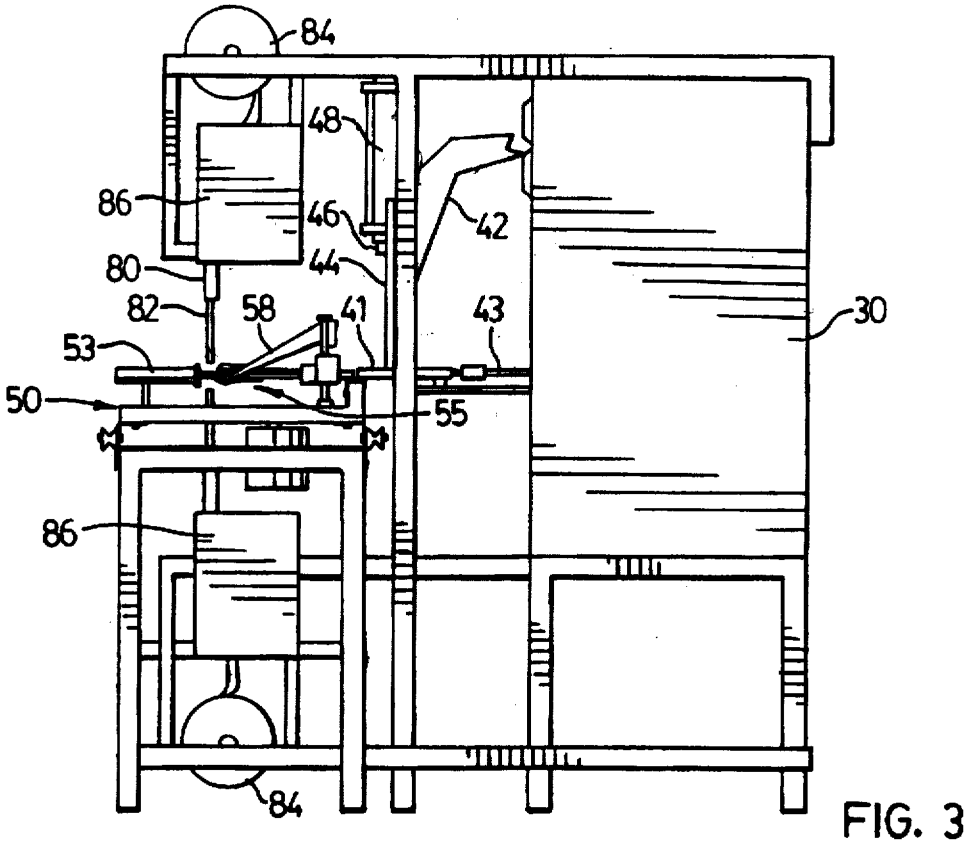
FIG. 3 is an end elevation of the apparatus of FIG. 1.
Figure 4:
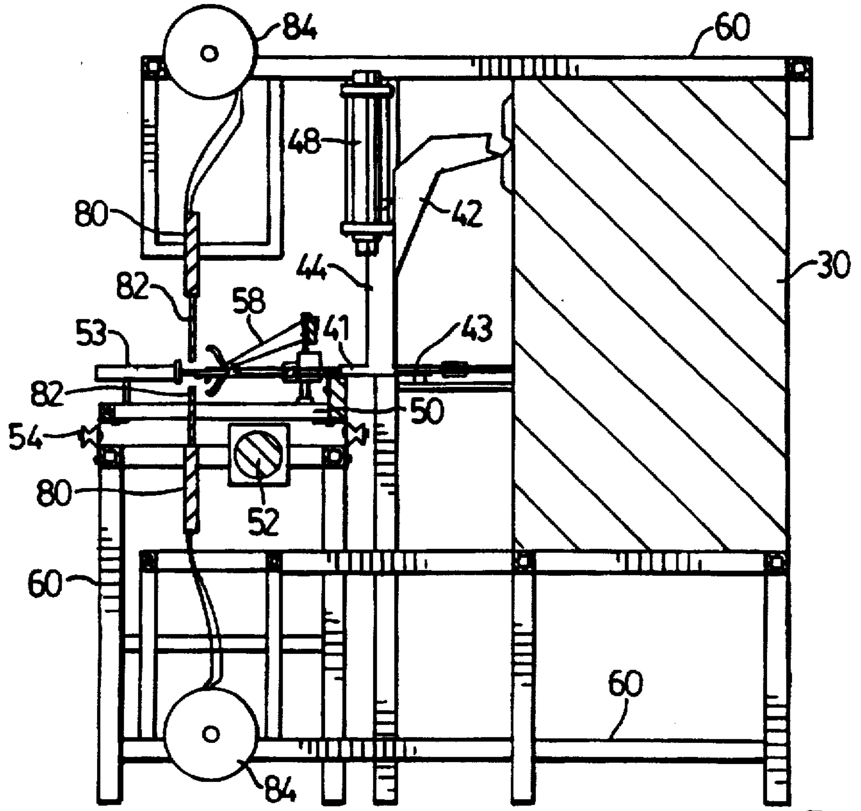
FIG. 4 is a vertical section through the apparatus on the line 3—3 in FIG. 1.
Figure 5:
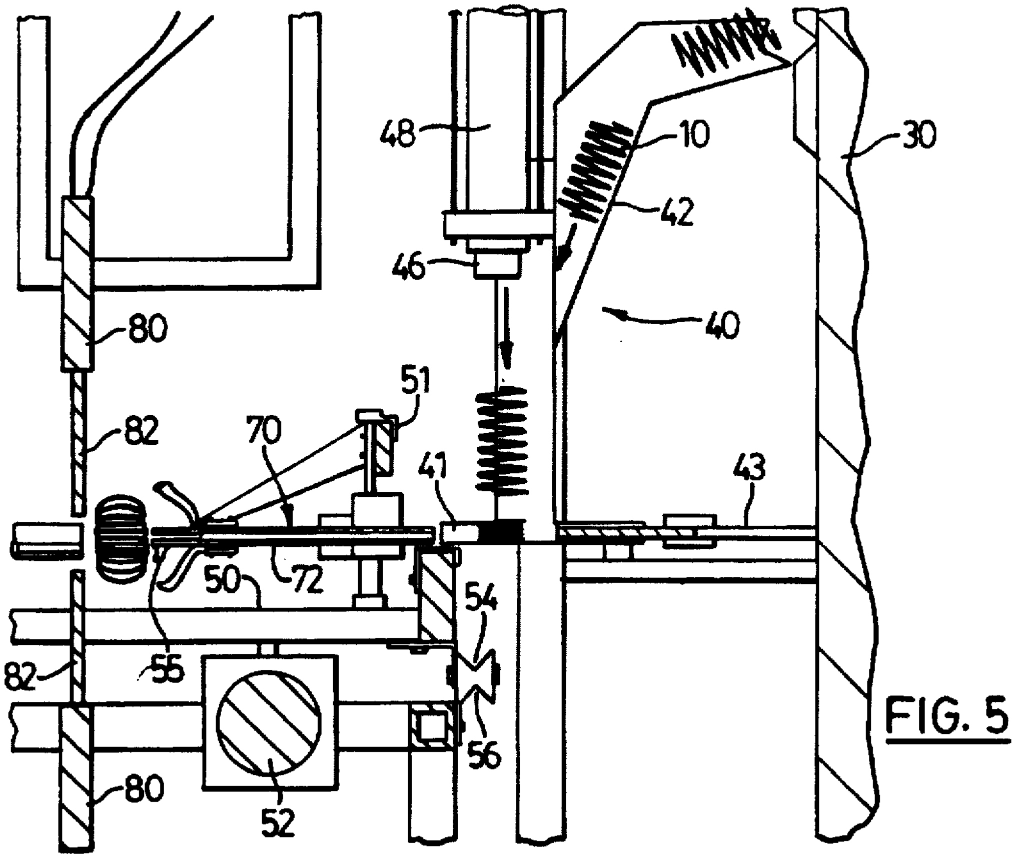
FIG. 5 is an enlarged view of a portion of FIG. 4.
Figure 6A:
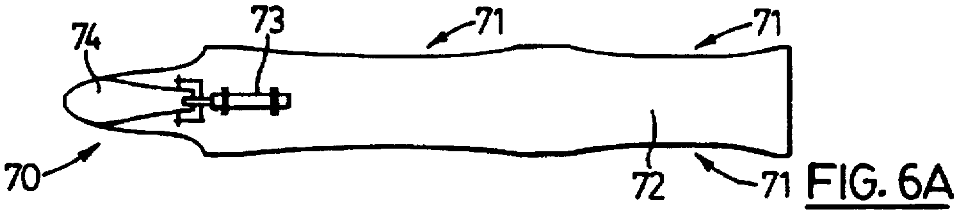
FIGS. 6A–6D are plan, side and end views, and an additional side view showing an open position, of parts of a spring insertion mechanism incorporated in the apparatus.
Figure 6C:
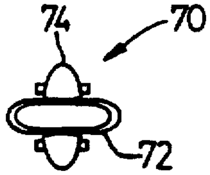
Figure 6B:
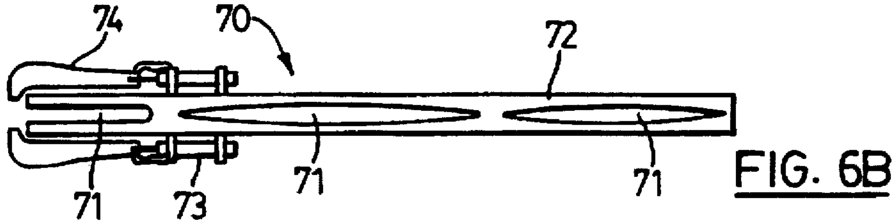
Figure 6D:
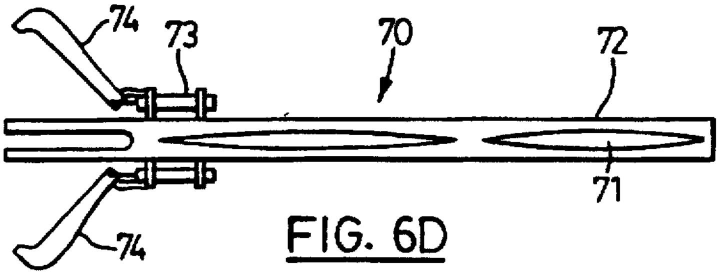
Figure 7:
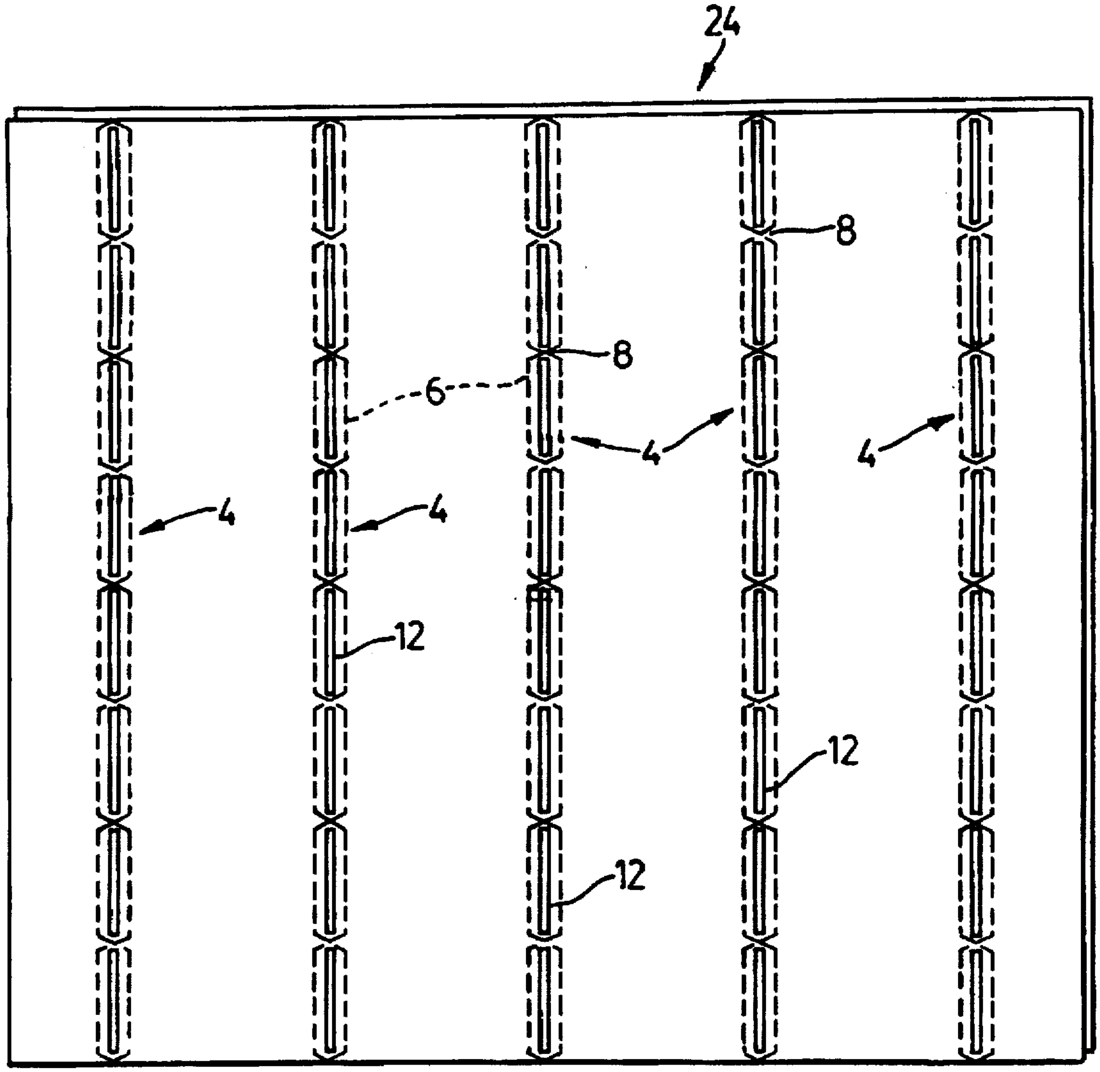
FIG. 7 is a plan view of a quilt utilized in the apparatus of FIGS. 1–6 in the manufacture of pocket spring assemblies.
Figure 9:
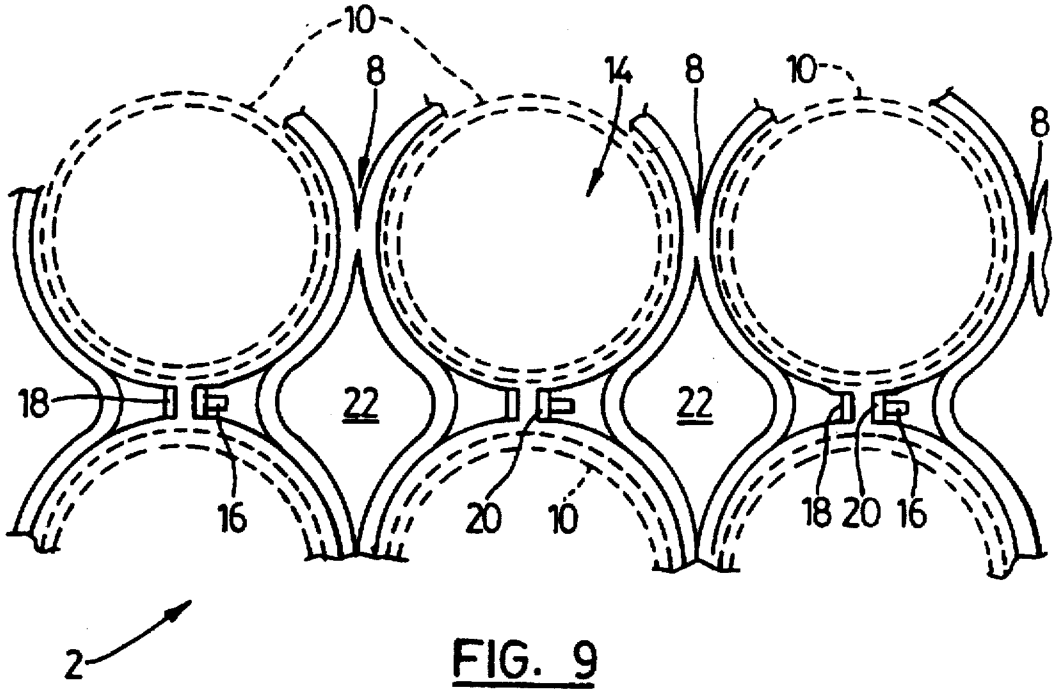
FIG. 9 is a fragmentary plan view of a completed spring assembly.
Figure 8:
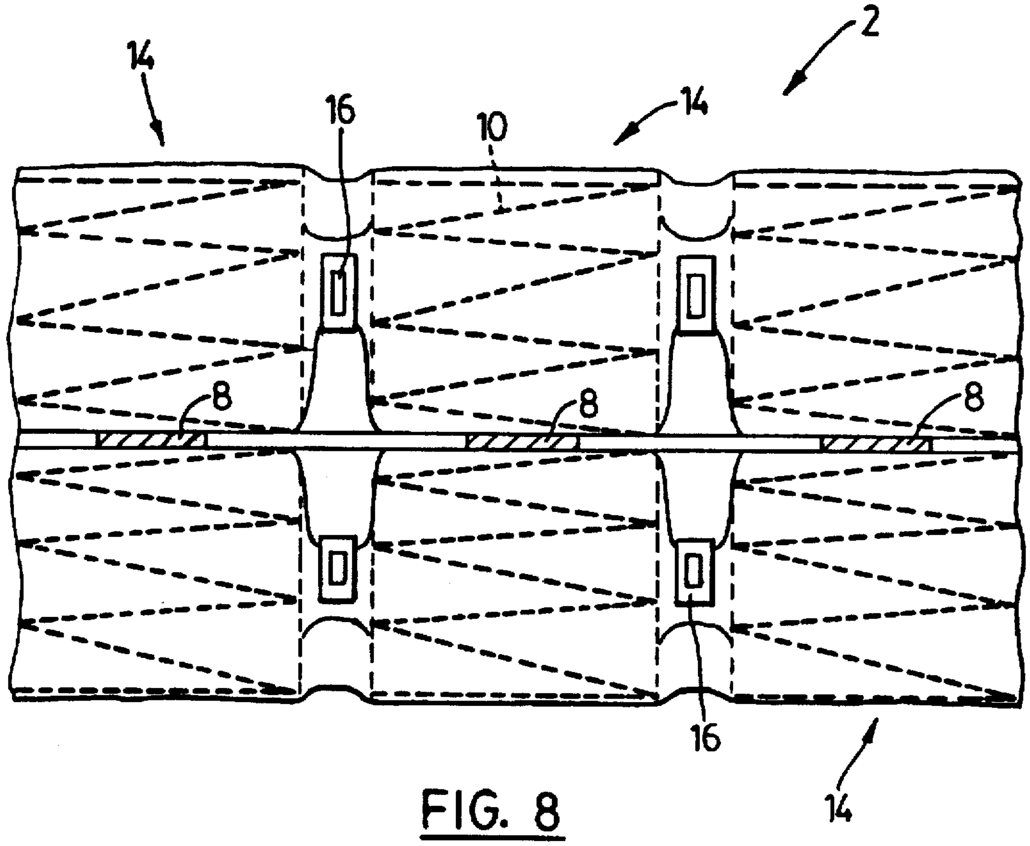
FIG. 8 is a fragmentary longitudinal section of a completed spring assembly.

Referring first to FIGS. 7, 8 and 9, which illustrate the construction of a spring assembly 2 according to the invention. The assembly 2 is formed by inserting springs into a fabric quilt 24 formed as shown in FIG. 7 by stitching together two layers of fabric, typically a non-woven synthetic fabric of a type conventionally used for enclosing pocket springs, along parallel spaced longitudinal zones 4. In a preferred arrangement, there are two lines of stitching 6 in each zone, which have intersections 8 at intervals with a pitch somewhat greater that the intended pitch of the springs in the finished assembly. The zones 4 are spaced by a distance approximately equal to the sum of the pitch of the spring and the thickness of the finished assembly. Taking the two layers together, this provides an area of fabric, within each rectangle defined by a stitching interval and a zone spacing, sufficient to form a pocket 14 which can envelope a spring 10 within the assembly.

The fabric quilt is formed on a conventional multi-needle quilting machine, equipped with an intermittent slitting roller assembly at its exit to form slits 12 between each line of stitching 6 in each zone 4, the slits being interrupted in the vicinity of each intersection 8 to retain connections between portions of the quilt separated by the zones 4. These connections are reinforced by the stitching. Other forms of bonding of the layers of fabric could be used instead of stitching provided that seams and connections of sufficient integrity can be obtained, and other stitching patterns could be used provided that the slits 12 have a seam on each side between the layers of fabric.

During assembly, and as discussed further below, a spring 10 is introduced into each pocket 14, a fold of the fabric in each layer is pinched together between adjacent springs in the longitudinal direction, to draw folds both above and below a horizontal centre line of the assembly out of a plane of the quilt, and the folds are then secured by a suitable form of fastening. This fastening could be a weld or staple, but for security it is preferred to use a two-part positive fastening in which an enlarged head of a tongue 16 on one fastening member 18 engaging one side of the fold is positively secured in an opening in a second fastening member 20 engaging the other side of the fold. As seen in FIG. 8, the spacing between the fasteners above and below the plane of the quilt, in a direction parallel to the axes of the springs, is less than the expanded length of the springs 10 within the pockets. The presence of the slits 12 permits the fabric to conform to and envelope the spring 10, leaving an aperture 22 between each adjacent group of four springs. The result is an integral pocket spring assembly in which adjacent spring pockets are connected by the fastened folds in the longitudinal direction, and the intersections 8 in the lateral direction. It will be appreciated that the size of the fabric quilt must be such as to provide sufficient pockets 14 in each dimension to provide an assembly of the desired size.

The springs are inserted into the quilt by the apparatus shown in FIGS. 1–6. The apparatus includes a spring making machine 30 which may be a conventional machine for forming coil springs from wire. Since its sole function is to provide springs for use by the rest of the apparatus, it could be replaced by a reservoir or magazine providing a source of springs, but integration of the spring making step into the apparatus is preferred and is particularly advantageous with the high capacity spring forming machines now becoming available.

A spring feeding assembly 40, discussed further below, feeds springs delivered by the machine 1 to spring insertion mechanisms 70 mounted on a moving table 50 supported on a machine frame 60 for lateral motion. A further laterally movable trolley (not shown) may be located in front of the frame 60, and can serve the dual purposes of preparing the quilt 24 for transfer to the table 50, and supporting a finished spring assembly as it is formed on the table.

The spring feeding assembly 40 has a chute 42 supported by the frame 60 which delivers successive springs emerging from the machine 30 into a vertical tube 44. Each spring 10 delivered into the tube 44 is compressed by a ram 46 of a pneumatic cylinder 48 so as to reduce its height to less than that of a passage 41 extending horizontally forward towards the table 50, so that a plunger 43 may project the compressed spring forwardly into the passage 41. The formation and ejection of springs by the machine 30, reciprocation of the ram 46, and movement of the table 50 are synchronized to provide delivery of compressed springs to successive spring insertion mechanisms 70. Depending upon the speed of the machine 30, it may be advantageous to provide more than one adjacent tube 44, ram 46, passage 41 and plunger 43, together with means associated with the chute 42 to direct springs into each of the tubes prior to each compression cycle, so as to speed up the rate of operation.

The insertion of a spring 10 into the passage 41 will result in a spring already in the passage being ejected into a rear end of a channel accumulator tube 72 (see FIGS. 6A–6D), or depending on the stroke of the plunger 43, the spring may be ejected directly into the tube 72. Each time a spring is inserted into a tube 72, the table 50 is indexed laterally to align a further assembly 70 with the passage 41. If there is more than one passage 41, the table is indexed a distance corresponding to the number of assemblies 70 being serviced simultaneously. When every assembly 70 has been serviced on one lateral pass of the table 50, a further pass is commenced, preferably with the table being indexed in the opposite direction rather than being returned to an opposite end of its stroke. This avoids unnecessary lateral movement of the fairly massive table 50, and of the spring assembly being formed. Indexing of the table 50 is performed by a cylinder 52 mounted on the frame 60, in association with limit switches and a brake, to control the indexing movement in known manner. The table is supported by rollers 54 engaging rails 56 secured to the frame 60.

In addition to a row of the assemblies 70, mounted at a pitch equal to the lateral pitch of springs in the finished spring assembly, the table 50 also supports a row of pusher arms 58 mounted at a similar pitch on an actuating bar 51 so as to flank each assembly 70. The actuating bar is moved first forwardly and then rearwardly by cylinders 53 between each lateral pass of the table 50 so that fingers 55 on the ends of the arms can enter the slits 12 in the quilt 24, and engage a lateral row of intersections 8 to draw the quilt forwardly through a distance equal to the distance between successive intersections 8. As the arms are withdrawn, the fingers ride over the next row of intersections and engage the slits beyond, ready for their next forward stroke.

Mounted on the frame 60 above and below the table 50, and laterally in line with the (or each) passage 41, are fastener applying mechanisms 80 utilized to apply the fastening members 18 and 20. Each mechanism 80 has two adjacent applicator guns 82 so that it can apply fasteners to folds of fabric on either side of an assembly 70. The guns may either operate simultaneously between every other indexing movement of the table, or preferably the leading gun may be utilized in each direction of movement of the table to ensure that fasteners are applied in folds to each side of each mechanism 70. The fasteners are fed from reels 84, and the mechanisms 80 and guns 82 are controlled by control boxes 86.

Each assembly 70 includes a flattened tube or guide 72 through which compressed springs from the passage 41 are advanced by one spring diameter each time a new spring is inserted into the passage 41, i.e. once for each pass of the table 50. In order to provide clearance between adjacent tubes 72 for the arms 58 without making the tubes so narrow as to promote jamming of the springs, portions of the horizontal side walls of the tube are cut away to form openings 71, which reduce the frictional engagement between the tube and the springs and provide clearance for the arms and for fabric gathered on the tubes. At a forward end of each tube 72 are pivoted upper and lower arms 74, actuated by small air cylinders 73 between extended (FIG. 6D) and retracted (FIGS. 6A–C) positions.

In use of the machine, a pre-prepared quilt 24 (see FIG. 7) is placed from the front on the tubes 72, so that a tube enters each tunnel formed by portions of the quilt between zones 4. The quilt is pushed as far onto the tubes as possible whilst the arms 58 are raised by cylinders 59 so that its material gathers on the rear portions of the tubes, and only a front edge of the quilt is pulled forward so that the fingers 53 of the arms 58 can engage the frontmost slit in each zone 4. Assuming that the tubes 72 are preloaded with springs, a pass of the table 50 is then run without inserting springs into the passages 41 so that the fastening mechanisms may apply initial fastenings to upper and lower folds of the fabric which are formed by opening the arms 74 on each tube 72. As an alternative, these fastenings could be applied before placing the quilt on the tubes 72. At the end of this pass, the arms 58 are actuated by the cylinders 53 so as to advance the quilt a further one pitch beyond the ends of the tubes. If the tubes 72 are not preloaded, sufficient passes during which springs are fed should be run to achieve this condition.

On subsequent passes of the table, springs are loaded into the passages 42, with the result that springs are ejected from the tubes or guides 72 into the pockets formed by the quilt to the rear of the fastenings applied in the previous pass, and further pockets are formed, by the application of fastenings by the application guns 82, behind the springs during each pass, followed by further advance of the quilt by the arms 58 at the end of each pass. This continues until the spring assembly is completed. The completed portion of the assembly can be supported on the separate trolley previously mentioned, which can move sideways as required with the table 50: the stepping motion of the table will be smoothed out by the flexibility of the spring assembly. A row of horns on the trolley may also be used to prepare a quilt for mounting on the tubes 72 and to assist in transferring it to the tubes 72 by aligning the horns, which may be hollow tubes, with the tubes 72.

According to the capability of the spring forming machine 30, if it is programmable, it may be possible to alter the characteristics of springs inserted into different portions of the assembly, e.g. the side and centre portions of a mattress assembly. Alternatively, more than one machine 30 and feed assembly 40 could be provided to service separate insertion mechanisms 70 adjacent different zones of the table 50.

I claim:

1. A method of producing a pocket spring assembly, wherein two layers of fabric are secured together along multiple parallel seam zones so as to form a quilt defining a plurality of parallel fabric tubes extending longitudinally of a plane of the quilt, the tubes so formed are supported on guides extending longitudinally through the tubes, portions of the tubes formed by the quilt are repeatedly drawn from the guides at their one ends, each layer of fabric in the drawn off portion is pinched to form folds extending oppositely out of the plane of the quilt, the folds are secured to form pockets from the drawn off portions of the quilt, and precompressed coil springs are passed through the guides and released into the pockets between each drawing of the quilt, with their axes perpendicular to both the plane of the quilt and the direction of advancement of the quilt, so that secured folds in the fabric of the tubes in front of and behind the released springs retain them in a two dimensional array of pockets with the axes of the springs perpendicular to the plane of the quilt.

2. A method according to claim 1, wherein the axes of said springs in the pockets of each respective tube are perpendicular to the parallel zones defining the tube and positioned midway between the parallel zones.

3. A method according to claim 1, wherein the said parallel zones extend in a common plane and the axes of said springs are perpendicular to said common plane.

4. A method according to claim 1, wherein spaced longitudinal slits are formed in the seam zones, the slits permitting the fabric to envelope the tubes.

5. A method according to claim 4, wherein the seam zones are formed by two rows of stitching which intersect between each slit.

6. A method of producing a pocket spring assembly, wherein two layers of fabric are secured together along multiple parallel seam zones so as to form a quilt defining a plurality of parallel fabric tubes, the tubes so formed are supported on guides extending longitudinally through the tubes, portions of the quilt are repeatedly drawn from the guides at their one ends and folds formed in each layer of fabric in the drawn off portion are secured to form pockets from the drawn off portions of the quilt, and precompressed coil springs are passed through the guides and released into the pockets between each drawing of the quilt, with their axes perpendicular to both the axes of the fabric tubes and the direction of advancement of the quilt, so that secured folds in the fabric of the tubes in front of and behind the released springs retain them in the pockets, wherein spaced longitudinal slits are formed in the seam zones, the slits permitting the fabric to envelope the tubes, and wherein the seam zones are formed by two rows of stitching which intersect between each slit.

7. Apparatus for producing a pocket spring assembly, comprising a row of parallel guides for receiving therearound tubes defined in a quilt formed by connecting two layers of fabric along parallel zones, mechanism to withdraw successive portions of the quilt from ends of the guides, mechanism to apply successive fastenings to folds formed in the fabric of the tubes the drawn off portions to form pockets, and mechanism to dispense compressed coil springs through the guides into the pockets as they are formed.

8. Apparatus according to claim 7, wherein the guides are associated with spreader arms adjacent their ends to form the folds in the fabric to opposite sides of the quilt, the arms being reciprocable between a withdrawn position permitting withdrawal of the quilt, and an extended position forming said folds in a withdrawn portion of the quilt.

9. Apparatus according to claim 7, wherein the guides are tubes, flattened in a common plane, and having portions of their adjacent edges cut away to improve clearance between the tubes and reduce friction on springs passing therethrough.

10. Apparatus according to claim 7, wherein the quilt extends along a plane and the precompressed springs are dispensed through the guides into the pockets with the axes of the precompressed springs perpendicular to the plane of the quilt.

11. Apparatus according to claim 7, wherein the axes of said springs in the pockets of each respective tube are perpendicular to the parallel zones defining the tube and positioned midway between the parallel zones.

12. Apparatus according to claim 7, wherein the said parallel zones extend in a common plane and the axes of said springs are perpendicular to said common plane.

13. Apparatus according to claim 7, wherein the plurality of parallel guides are mounted on a table mounted for movement in a direction perpendicular to the axes of the guides, including mechanism to index the table to bring successive guides into alignment with the spring dispensing mechanism, and with the mechanisms to apply fastenings.

14. Apparatus according to claim 13, including a spring forming machine providing springs to the spring dispensing mechanism.

15. A pocket spring assembly comprising a quilt formed from two layers of fabric secured together along multiple parallel seam zones to form a plurality of fabric tubes, the fabric of each layer being secured into a row of spaced folds by a plurality of regularly spaced pairs of connections along each fabric tube to form the fabric tubes into an array of pockets extending both longitudinally and laterally of the seam zones, and a coil spring extended within each pocket with its axis perpendicular to a plane of the quilt, the fastenings in each pair being located in opposite perpendicularly spaced directions out of the plane of the quilt.

16. A pocket spring assembly according to claim 9, in which springs in different parts of the assembly have different characteristics.

17. A pocket spring assembly according to claim 9, in which the folds are secured between each spring by two fastenings, spaced in a direction parallel to the axes of the springs by a distance less than an expanded length of a spring within the pocket.

18. A pocket spring assembly according to claim 15, wherein the quilt has slits in the seam zones between adjacent tubes, the slits forming apertures between folds secured in the fabric of adjacent fabric tubes.

19. A pocket spring assembly according to claim 18, wherein the seam zones between adjacent tubes each comprise dual lines of stitching extending longitudinally of the seam zone and intersecting between each slit, the slits extending between the lines of stitching.

20. A quilt for forming a pocket spring assembly having a predetermined thickness and spring pitch, comprising two layers of fabric secured together along multiple parallel seam zones, spaced by a distance approximately equal to a sum of the spring pitch and the assembly thickness, to form a plurality of fabric tubes, and a plurality of separate regularly spaced slits formed longitudinally of each seam zone between adjacent fabric tubes, the slits having a length such as to permit each layer of fabric of the tubes adjacent the slits to be secured into a fold, the folds when so formed dividing the tubes into an array of pockets each of sufficient size to accommodate a coil spring having its axis perpendicular to a plane of the quilt.

21. A quilt according to claim 20, wherein the seam zones between adjacent tubes each comprise dual lines of stitching extending longitudinally of the seam zone and intersecting between each slit, the slits extending between the lines of stitching.

22. A method of producing pocketed springs, wherein two layers of fabric are secured together along parallel zones so as to form a quilt extending in a plane and defining at least one fabric tube extending along an axis longitudinally of the plane of the quilt, the tube so formed is supported on a guide extending longitudinally through the tube wherein longitudinally adjacent portions of the tube formed by the quilt are repeatedly drawn from the guide at one end thereof, each layer of fabric in the drawn off portion is pinched to form folds extending oppositely out of the plane of the quilt, the folds are secured to form adjacent pockets in the tube from the drawn off portions of the quilt wherein a precompressed coil spring is passed through the guide along the axis of the tube and released into each pocket between each drawing of the quilt as the pocket is being formed with the axis of the precompressed spring perpendicular to both the plane of the quilt and the direction of advancement of the quilt, so that secured folds in the fabric of the tubes in front of and behind the released springs retain the springs in the pockets with the axis of the springs perpendicular to the plane of the quilt.

23. A method according to claim 22, wherein the axes of said springs are perpendicular to said parallel zones and positioned midway therebetween.

24. A method according to claim 22, wherein said parallel zones extend in a common plane and the axes of said springs are perpendicular to said common plane.

25. Apparatus for producing pocketed springs comprising two layers of fabric connected along parallel zones to form a quilt extending in a plane and defining at least one tube extending along an axis longitudinally of the plane of the quilt, at least one guide for receiving therearound the tube defined in the quilt, mechanism to withdraw successive portions of the quilt from the end of the guide, mechanism to apply successive fastenings to folds formed in the fabric of the tube in the drawn off portions to form successive pockets, said folds extending oppositely out of the plane of the quilt, and mechanism to successively dispense compressed coil springs along the axis of the tube through the guide into the pockets as the pockets are being formed with the springs being dispensed with the axes thereof perpendicular to the plane of the quilt.

26. Apparatus according to claim 25, wherein said dispensing mechanism successively dispenses said springs with the axes thereof perpendicular to said parallel zones and positioned midway therebetween.

27. The apparatus according to claim 25, wherein said parallel zones extend in a common plane and said dispensing mechanism successively dispenses said springs with the axes thereof perpendicular to said common plane.

* * * * *